(12) United States Patent
Okada (10) Patent No.: US 10,996,329 B2
(45) Date of Patent: May 4, 2021

(54) DISTANCE ESTIMATING SYSTEM

(71) Applicant: DENSO CORPORATION, Kariya (JP)

(72) Inventor: Noriaki Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 268 days.

(21) Appl. No.: 16/276,665

(22) Filed: Feb. 15, 2019

(65) Prior Publication Data

US 2019/0179004 A1 Jun. 13, 2019

Related U.S. Application Data

(63) Continuation of application No. PCT/JP2017/023904, filed on Jun. 29, 2017.

(30) Foreign Application Priority Data

Aug. 22, 2016 (JP) .............................. JP2016-162184

(51) Int. Cl.
  *G01S 13/78* (2006.01)
  *H04B 1/7183* (2011.01)
  (Continued)

(52) U.S. Cl.
  CPC ............ *G01S 13/785* (2013.01); *G01S 7/282* (2013.01); *G01S 7/285* (2013.01); *G01S 13/08* (2013.01);
  (Continued)

(58) Field of Classification Search
  CPC ........ G01S 7/282; G01S 7/285; G01S 13/785; G01S 13/08; G01S 13/76; G01S 13/103;
  (Continued)

(56) References Cited

U.S. PATENT DOCUMENTS 4,112,421 A * 9/1978 Freeny, Jr. ................ G01S 5/14
  340/8.1
5,382,952 A * 1/1995 Miller .................. G01S 13/758
  235/440

(Continued)

FOREIGN PATENT DOCUMENTS

JP 2014084595 A 5/2014

*Primary Examiner* — Erin F Heard
*Assistant Examiner* — Michael W Justice
(74) *Attorney, Agent, or Firm* — Harness, Dickey & Pierce, P.L.C.

(57) ABSTRACT

In a distance estimating system, a first terminal transmits a response request signal and successively transmits impulse signals as synchronization signals, and a second terminal receives the response request signal, generates response data based on the response request signal, shifts a bit, which is a transmission target in a bit string as the response data, by one toward a rear side from a leading bit to a trailing bit each time the synchronization signal is received, transmits the impulse signal in a case where a value of a bit that is a transmission target at a time of reception of the synchronization signal is a predetermined value. The first terminal further measures a round-trip time, specifies a flight time of the impulse signal, and estimates a distance to the second terminal based on the flight time and a propagation velocity of the impulse signal.

6 Claims, 5 Drawing Sheets (51) Int. Cl.
*G01S 13/76* (2006.01)
*G01S 15/74* (2006.01)
*G01S 7/282* (2006.01)
*G01S 7/285* (2006.01)
*G01S 13/08* (2006.01)

(52) U.S. Cl.
CPC .............. *G01S 13/76* (2013.01); *G01S 15/74* (2013.01); *H04B 1/7183* (2013.01)

(58) Field of Classification Search
CPC ......... G01S 15/74; H04B 1/7183; H04B 1/59; H04B 1/70735
USPC .......................................................... 342/47
See application file for complete search history.

(56) References Cited

U.S. PATENT DOCUMENTS

| | | | | |
|---|---|---|---|---|
| 6,028,868 | A * | 2/2000 | Yeung | G06F 9/546 370/515 |
| 6,487,238 | B1 * | 11/2002 | Kamo | H04B 1/70735 375/150 |
| 7,313,127 | B2 * | 12/2007 | Hoctor | H04B 1/7183 370/350 |
| 7,787,516 | B2 * | 8/2010 | Kim | H04B 1/7183 375/131 |
| 2015/0200706 | A1 * | 7/2015 | Bottazzi | G01S 13/0209 375/140 |

* cited by examiner

DISTANCE ESTIMATING SYSTEM

CROSS REFERENCE TO RELATED APPLICATIONS

The present application is a continuation application of International Patent Application No. PCT/JP2017/023904 filed on Jun. 29, 2017, which designated the United States and claims the benefit of priority from Japanese Patent Application No. 2016-162184 filed on Aug. 22, 2016. The entire disclosures of all of the above applications are incorporated herein by reference.

TECHNICAL FIELD

The present disclosure relates to a distance estimating system.

BACKGROUND

Regarding a system in which a first communication terminal (hereinafter referred to as first terminal) and a second communication terminal (hereinafter referred to as second terminal) mutually perform wireless communication, various techniques have been studied for estimating a distance (hereinafter referred to as an inter-terminal distance) from the second terminal to the first terminal based on a condition of the first terminal receiving a signal transmitted from the second terminal.

SUMMARY

The present disclosure provides a distance estimating system including a first terminal and a second terminal that perform wireless communication. The first terminal transmits a response request signal and successively transmits impulse signals as synchronization signals. The second terminal receives the response request signal, generates response data based on the response request signal, shifts a bit, which is a transmission target in a bit string as the response data, by one toward a rear side from a leading bit to a trailing bit each time the synchronization signal is received, transmits the impulse signal in a case where a value of a bit that is a transmission target at a time of reception of the synchronization signal is a predetermined value. The first terminal further measures a round-trip time, specifies a flight time of the impulse signal, and estimates a distance to the second terminal based on the flight time and a propagation velocity of the impulse signal.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

As a method of estimating a distance between a first terminal and a second terminal mutually performing wireless communication, a time (hereinafter referred to as round-trip time) from when the first terminal transmits a signal requesting a response to the second terminal to when the first terminal receives the response from the second communication terminal may be measured, and an inter-terminal distance may be estimated based on the round-trip time and a propagation velocity of a radio wave.

As a communication system for the first and second terminals, ultra-wide band-impulse radio (UWB-IR) using on-off keying as a modulation method is available. UWB-IR is a method for performing communication by transmitting a signal with a pulse width of a very short time (e.g., several ns) (i.e., impulse signal). When the on-off keying is applied to UWB-IR, the presence or absence of the impulse signal at a scheduled transmission or reception time indicates a bit value (i.e., 0 or 1) of digital data.

When it is configured such that the second terminal does not return a signal transmitted from the first terminal as it is, but generates a response signal corresponding to a content of the received signal and returns the generated signal, the round-trip time includes a time required for arithmetic processing for the second terminal to generate the response signal corresponding to the received signal (hereinafter referred to as required computing time) (this is taken as an assumed configuration).

For example, in a system in which the first terminal and the second terminal perform authentication processing by a challenge response method by wireless communication, when a time from completion of transmission of a challenge signal by a first terminal to reception of a response signal is adopted as a round-trip time, the round-trip time includes a required computing time for generating the response signal in the second terminal.

Since the required computing time included in the round-trip time is not actually a time during which radio waves are propagated, when the round-trip time is assumed as a time during which radio waves propagate as it is (so-called flight time) and an inter-terminal distance is calculated, an error corresponding to a length of the required computing time arises in the calculated inter-terminal distance.

For dealing with such an issue, when an assumed value of the required computing time in the second terminal is prescribed and the assumed value of the required computing time is excluded from a measured round-trip time, an error of an estimated inter-terminal distance from an actual value can be reduced to a certain extent.

However, an error corresponding to accuracy of a clock oscillator provided in the second terminal is included in an error between a design value of the required computing time and the actual value. Further, depending on accuracy of a clock oscillator provided in the first terminal, a time measured as the round-trip time itself also includes an error. An influence of such an error arising from the accuracy of each clock oscillator is accumulated and increases as the required computing time is longer or a total round-trip time is longer.

Needless to say, when the error included in the round-trip time is large, the error of the flight time determined from the round-trip time becomes large. Since the flight time error affects the accuracy of the estimated inter-terminal distance, a smaller error of the flight time is preferable.

A distance estimating system according to an aspect of the present disclosure includes a first terminal and a second terminal that perform wireless communication of on-off keying by transmitting and receiving impulse signals. The first terminal includes a data generation unit, a first terminal side transmitter, and a first terminal side receiver. The data generation unit generates response request data for requesting the second terminal to return a response signal. The first terminal side transmitter transmits a response request signal in which the impulse signals are arranged at a predetermined transmission interval in accordance with a bit string constituting the response request data, and successively transmits the impulse signals as synchronization signals at the predetermined transmission interval for a predetermined time after the transmission of the response request signal is completed. The first terminal side receiver receives the impulse signals returned from the second terminal as the response signal to the response request signal. The second terminal includes a second terminal side receiver, a response data generation unit, a transmission target bit setting unit, and a second terminal side transmitter. The second terminal side receiver receives the response request signal. The response data generation unit generates response data based on a bit string as the response request data, specified by demodulating the response request signal received by the second terminal side receiver. The transmission target bit setting unit that shifts a bit, which is a transmission target in a bit string as the response data generated by the response data generation unit, by one toward a rear side from a leading bit to a trailing bit each time the synchronization signal is received. The second terminal side transmitter transmits the impulse signal in a case where a value of the bit that is the transmission target at a time point of reception of the synchronization signal is a predetermined value previously determined as a value indicating that the impulse signal is to be transmitted, and transmits no impulse signal in a case where the value of the bit is not the predetermined value. The first terminal further includes a round-trip timer and a distance estimation unit. The round-trip timer measures a time from transmission of the synchronization signal to reception of the impulse signal as a round-trip time. The distance estimation unit specifies a flight time during which the impulse signal has propagated through a space based on the round-trip time measured by the round-trip timer, and estimates a distance to the second terminal based on the flight time and a propagation velocity that is a speed at which the impulse signal propagates in the space.

A distance estimating system according to another aspect of the present disclosure includes a first terminal and a second terminal that perform wireless communication of on-off keying by transmitting and receiving impulse signals. The first terminal includes a first terminal side controller, a first terminal side transmitter, and a first terminal side receiver. The first terminal side controller includes a processor and a non-transitory tangible storage medium storing a first terminal program. The first terminal program instructs the processor in the first terminal side controller to generate response request data for requesting the second terminal to return a response signal. The first terminal side transmitter is connected with the first terminal side controller, transmits a response request signal in which the impulse signals are arranged at a predetermined transmission interval in accordance with a bit string constituting the response request data, and successively transmits the impulse signals as synchronization signals at the predetermined transmission interval for a predetermined time after the transmission of the response request signal is completed. The first terminal side receiver is connected with the first terminal side controller, receives the impulse signals returned from the second terminal as the response signal to the response request signal. The second terminal includes a second terminal side receiver, a second terminal side controller, and a second terminal side transmitter. The second terminal side receiver receives the response request signal. The second terminal side controller is connected with the second terminal side receiver and includes a processor and a non-transitory tangible storage medium storing a second terminal program. The second terminal program instructs the processor in the second terminal side controller to generate response data based on a bit string as the response request data, specified by demodulating the response request signal received by the second terminal side receiver, and to shift a bit, which is a transmission target in a bit string as the response data, by one toward a rear side from a leading bit to a trailing bit each time the synchronization signal is received. The second terminal side transmitter is connected with the second terminal side controller, transmits the impulse signal in a case where a value of the bit that is the transmission target at a time point of reception of the synchronization signal is a predetermined value previously determined as a value indicating that the impulse signal is to be transmitted, and transmits no impulse signal in a case where the value of the bit is not the predetermined value. The he first terminal program further instructs the processor in the first terminal side controller to measure a time from transmission of the synchronization signal to reception of the impulse signal as a round-trip time, to specify a flight time during which the impulse signal has propagated through a space based on the round-trip time, and to estimate a distance to the second terminal based on the flight time and a propagation velocity that is a speed at which the impulse signal propagates in the space.

According to the above-described distance estimating systems, the distance between the first communication terminal and the second communication terminal can be estimated more accurately.

Figure 1:
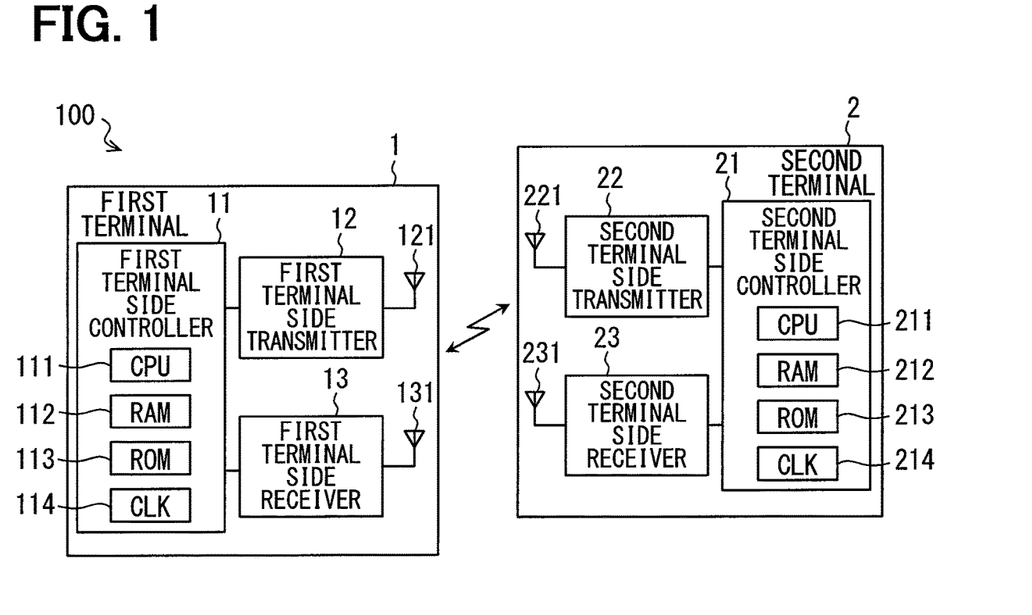
FIG. 1 is a block diagram showing a schematic configuration of a distance estimating system.

Hereinafter, embodiments of the present disclosure will be described with reference to the drawings. FIG. 1 is a diagram showing an example of a schematic configuration of a distance estimating system 100 according to the present embodiment. As shown in FIG. 1, the distance estimating system 100 includes a first terminal 1 which is a first communication terminal and a second terminal 2 which is a second communication terminal.

The first terminal 1 may be carried by a user or may be mounted on a moving body such as a vehicle. The first terminal 1 may also be fixed to a road, a facility, or the like. The first terminal 1 may also be a portable device. The same applies to the second terminal 2. Hereinafter, when the first terminal 1 and the second terminal 2 are not distinguished from each other, each terminal will be described as a communication terminal.

The first terminal 1 and the second terminal 2 perform ultra-wide band-impulse radio (UWB-IR) communication. UWB-IR is a method for performing communication by transmitting a signal with a pulse width of a very short time (e.g., several ns) (i.e., impulse signal).

As a modulation method of wireless communication performed by these communication terminals, on-off keying (OOK) for transmitting information by the presence or absence of an impulse signal is adopted. That is, the communication terminal on the transmission side transmits an impulse signal in the case of transmitting a binary 1, and does not transmit an impulse signal in the case of transmitting a binary 0. An interval (hereinafter, transmission interval) in the case of continuously transmitting the impulse signal is predetermined. For example, the transmission interval may be 1 ms.

When receiving the impulse signal, the communication terminal on the reception side detects that a binary 1 has been received. When not receiving the impulse signal at a position on a time axis (hereinafter referred to as scheduled reception position) on which reception of an impulse signal is scheduled, the communication terminal on the reception side detects a binary 0. The scheduled reception position is disposed for each transmission interval with reference to the time point at which the impulse signal is received. Needless to say, the scheduled reception position may be determined by establishing synchronization between communication terminals by a well-known method.

(Configuration of First Terminal 1)

First, a configuration of the first terminal 1 will be described. As shown in FIG. 1, the first terminal 1 includes a first terminal side controller 11, a first terminal side transmitter 12, and a first terminal side receiver 13. The first terminal side controller 11 is communicably connected to each of the first terminal side transmitter 12 and the first terminal side receiver 13.

The first terminal side controller 11 is a module for controlling operations of the first terminal side transmitter 12 and the first terminal side receiver 13. The first terminal side controller 11 is configured as a normal computer, including a CPU 111, a RAM 112, a ROM 113, a clock oscillator 114, a bus line that connects these components. The CPU 111 is a central processing unit achieved by using a microprocessor or the like. The RAM 112 is a volatile memory, and the ROM 113 is a nonvolatile memory. The ROM 113 stores a program (hereinafter referred to as first terminal program) for causing a normal computer to function as the first terminal 1. The clock oscillator 114 successively outputs a clock signal at a predetermined operation frequency. As the clock oscillator 114, one having a desired operation frequency and accuracy may be used. For example, as the clock oscillator 114, a crystal oscillator, a rubidium oscillator, or the like can be used.

Note that the above first terminal program may be stored in a non-transitory tangible storage medium. Execution of the first terminal program by the CPU 111 corresponds to execution of a method corresponding to the first terminal program.

The first terminal side controller 11 generates data (hereinafter, transmission data) to be transmitted to the second terminal 2, and transmits a pulse series signal corresponding to the transmission data to the second terminal 2 in cooperation with the first terminal side transmitter 12. Note that the pulse series signal here means a signal series which is generated by modulating the transmission data by on-off keying and in which a plurality of impulse signals are arranged at predetermined time intervals. In addition, the first terminal side controller 11 acquires the data received by the first terminal side receiver 13. Functions and operations of the first terminal side controller 11 will be described later.

The first terminal side transmitter 12 is provided with an antenna 121 for transmitting an impulse signal. The first terminal side transmitter 12 sequentially transmits an impulse signal based on an instruction from the first terminal side controller 11. Specifically, when an electrical impulse signal is input from the first terminal side controller 11, the impulse signal is amplified or shaped to be output to the antenna 121 and radiated as a radio wave.

The first terminal side receiver 13 includes an antenna 131 for receiving the impulse signal transmitted by the second terminal 2. The first terminal side receiver 13 receives the impulse signal transmitted by the second terminal 2 via the antenna 131, shapes or amplifies the impulse signal, and outputs the impulse signal to the first terminal side controller 11.

(Function Provided in First Terminal Side Controller 11)

Figure 2:
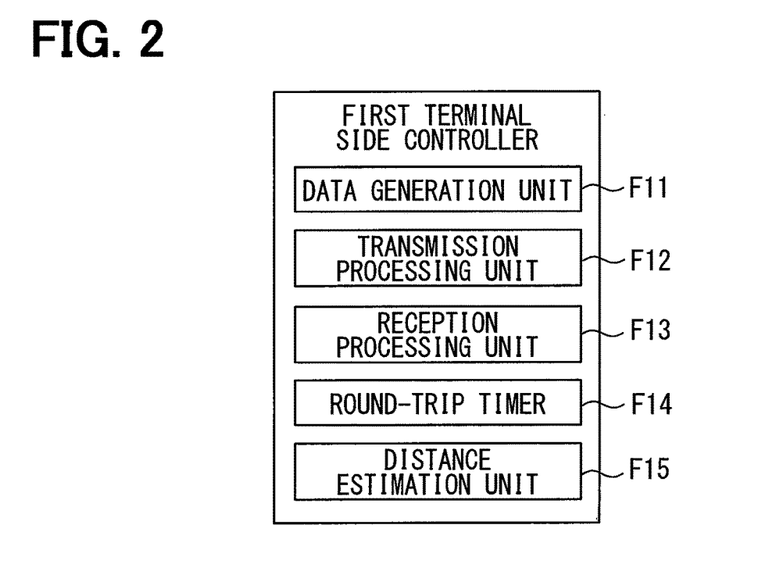
FIG. 2 is a functional block diagram showing a schematic configuration of a first terminal side controller.

As shown in FIG. 2, as functions to be achieved by the CPU 111 executing the first terminal program, the first terminal side controller 11 includes a data generation unit F11, a transmission processing unit F12, a reception processing unit F13, a round-trip timer F14, and a distance estimation unit F15. Note that some or all of various functional blocks of the first terminal side controller 11 may be achieved as hardware by using one or more integrated circuits (ICs).

The data generation unit F11 is a functional block for generating data to be transmitted to the second terminal 2 (i.e., transmission data). Among various pieces of transmission data generated by the data generation unit F11, data requesting the second terminal 2 to return a response signal is referred to as response request data.

Here, as an example, it is assumed that the data generation unit F11 is configured to be able to generate a plurality of types of response request data. More specifically, the data generation unit F11 according to the present embodiment generates data in which a bit string (i.e., bit pattern) is set to "11011" as one piece of response request data. Also, data of a bit string consisting of "10101" is generated as another piece of response request data. A transmission condition for each piece of response request data may be designed appropriately, such as in what case the response request data is generated, and the pulse series signal corresponding to the data is transmitted in cooperation with the first terminal side transmitter 12. Note that a bit number and the bit pattern constituting the response request data may be designed appropriately.

As will be described later, when receiving the response request data, the second terminal 2 generates response data corresponding to a content (more specifically, bit pattern) of the received response request data. Then, the pulse series signal corresponding to the generated response data is returned to the first terminal 1.

Figure 3:
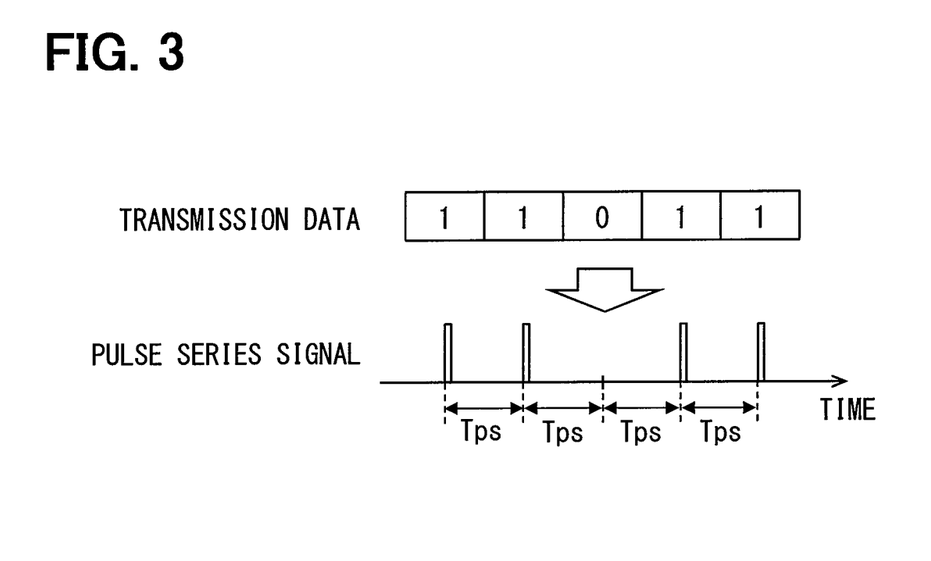
FIG. 3 is a diagram for explaining a modulation method adopted by the distance estimating system.

The transmission processing unit F12 modulates the transmission data, generated by the data generation unit F11, by on-off keying. As a result, as shown in FIG. 3, in accordance with a value of each bit (specifically, 1 or 0) constituting the transmission data, the transmission data is converted into a pulse series signal in which pulse signals each having an extremely narrow time width (i.e., impulse signals) are arranged. Note that Tps shown in FIG. 3 represents the transmission interval described above.

Then, the transmission processing unit F12 sequentially outputs the impulse signals constituting the pulse series signal generated as described above to the first terminal side transmitter 12. Hence, the pulse series signal generated by the transmission processing unit F12 is radiated as a radio wave from the antenna 121. Note that the pulse series signal obtained by modulating the response request data corresponds to the response request signal.

After transmitting the transmission data, the transmission processing unit F12 successively transmits the impulse signal as the synchronization signal at the transmission interval Tps described above for a fixed time (e.g., several tens of milliseconds) from a time point at which a predetermined standby time Tw elapses.

The reception processing unit F13 acquires the pulse series signal transmitted by the second terminal 2 based on the impulse signal input from the first terminal side receiver 13. The pulse series signal acquired by the reception processing unit F13 is a signal obtained by arranging a plurality of impulse signals input from the first terminal side receiver 13 at an actual reception interval in a time series manner.

The reception processing unit F13 demodulates the received pulse series signal and restores the data transmitted by the second terminal 2. That is, the reception processing unit F13 acquires data (e.g., response data) obtained by demodulating the reception signal.

The round-trip timer F14 is a timer that measures the time (hereinafter referred to as round-trip time) from when the first terminal side transmitter 12 transmits the synchronization signal to when the first terminal side receiver 13 receives the impulse signal returned from the second terminal 2. The round-trip timer F14 counts the clock signal input from the clock oscillator 114 to measure an elapsed time from transmission of the synchronization signal. The count value of the round-trip timer F14 returns to 0 (i.e., the count value is reset) each time the synchronization signal is transmitted. Therefore, the time held by the round-trip timer F14 corresponds to the elapsed time from the last transmission of the synchronization signal.

The distance estimation unit F15 estimates a distance between the first terminal 1 and the second terminal 2 (hereinafter, inter-terminal distance) based on the round-trip time acquired by the round-trip timer F14. Details of the distance estimation unit F15 will be described later.

(Configuration of Second Terminal 2)

Next, a configuration of the second terminal 2 will be described. As shown in FIG. 1, the second terminal 2 includes a second terminal side controller 21, a second terminal side transmitter 22, and a second terminal side receiver 23. The second terminal side controller 21 is communicably connected to each of the second terminal side transmitter 22 and the second terminal side receiver 23.

The second terminal side controller 21 is a module for controlling operations of the second terminal side transmitter 22 and the second terminal side receiver 23. The second terminal side controller 21 is configured as a normal computer, including a CPU 211, a RAM 212, a ROM 213, a clock oscillator 214, a bus line that connects these components. Components having the same names as the components of the first terminal 1 such as the CPU 211 have the same functions as those of the first terminal 1. The ROM 213 stores a program (hereinafter, second terminal program) for causing a normal computer to function as the second terminal 2.

The functions and operations of the second terminal side controller 21 will be described later separately, but are schematically as follows. The second terminal side controller 21 acquires the data received by the second terminal side receiver 23. Then, when acquiring the response request data transmitted by the first terminal 1, the second terminal side controller 21 generates response data corresponding to the response request data and returns the response data to the first terminal 1 in cooperation with the second terminal side transmitter 22.

The second terminal side transmitter 22 includes an antenna 221 for transmitting an impulse signal and transmits the impulse signal based on an instruction from the second terminal side controller 21. The second terminal side receiver 23 includes an antenna 231 for receiving the impulse signal transmitted by the second terminal 2. The second terminal side receiver 23 receives the impulse signal transmitted by the second terminal 2 via the antenna 231, shapes or amplifies the impulse signal, and outputs the impulse signal to the second terminal side controller 21.

(Function Provided in Second Terminal Side Controller 21)

Figure 4:
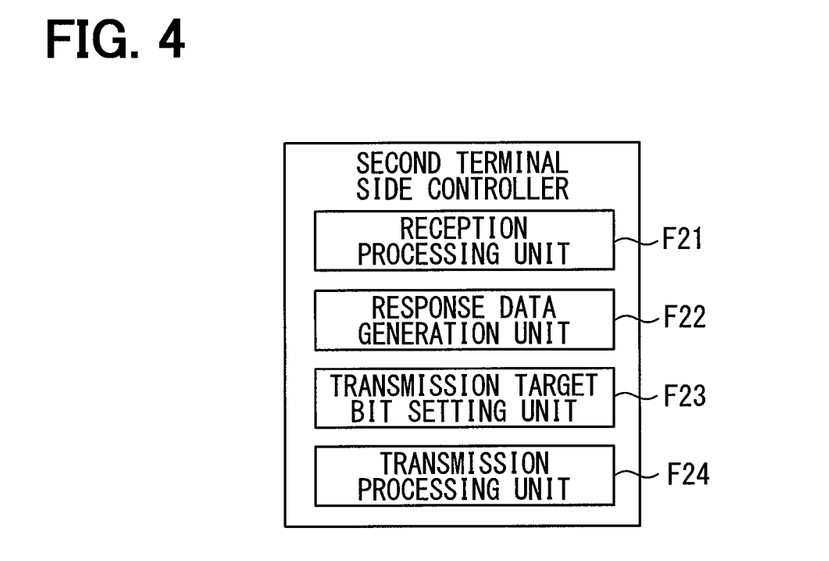
FIG. 4 is a functional block diagram showing a schematic configuration of a second terminal side controller.

As shown in FIG. 4, as functional blocks to be achieved by the CPU 211 executing the second terminal program, the second terminal side controller 21 includes a reception processing unit F21, a response data generation unit F22, a transmission target bit setting unit F23, and a transmission processing unit F24. Note that some or all of various functional blocks of the second terminal side controller 21 may be achieved as hardware by using one or more ICs.

The reception processing unit F21 acquires the pulse series signal (e.g., response request signal) transmitted by the first terminal 1 based on the impulse signal input from the second terminal side receiver 23. The reception processing unit F21 then demodulates the received pulse series signal and restores the data transmitted by the first terminal 1. That is, the reception processing unit F21 acquires data (e.g., response request data) obtained by demodulating the reception signal.

The response data generation unit F22 generates response data corresponding to the response request data acquired by the reception processing unit F21. For example, when receiving response request data with a bit string "11011", the response data generation unit F22 generates a bit string consisting of "1010101" as response data. When receiving response request data with a bit string "10101", the response data generation unit F22 generates a bit spring consisting of "1110111" as response data.

What type of response data is generated for what type of response request data may be designed appropriately. It may only be designed such that the response data to be generated by the response data generation unit F22 is uniquely determined with respect to the received response request data. The response data generated by the response data generation unit F22 is provided to the transmission target bit setting unit F23.

The transmission target bit setting unit F23 shifts a bit which is a transmission target by one toward a rear side from a leading bit to a trailing bit of a bit string constituting the response data of the response data generation unit F22 each time the synchronization signal is received. When the value of the transmission target bit is 1, the transmission target bit setting unit F23 sets the transmission processing unit F24 to a transmission preparation mode. On the other hand, when the value of the transmission target bit is 0, the transmission target bit setting unit F23 sets the transmission processing unit F24 to a transmission hold mode.

The transmission processing unit F24 includes the transmission preparation mode and the transmission hold mode as operation modes. In a case where the transmission preparation mode is set by the transmission target bit setting unit F23, when the reception processing unit F21 receives a synchronization signal, the reception processing unit F21 outputs the impulse signal to the second terminal side transmitter 22 to be transmitted as a radio wave. On the other hand, in a case where the transmission hold mode is set by the transmission target bit setting unit F23, even when the reception processing unit F21 receives a synchronization signal, the reception processing unit F21 does not output the impulse signal to the second terminal side transmitter 22.

Figure 5:
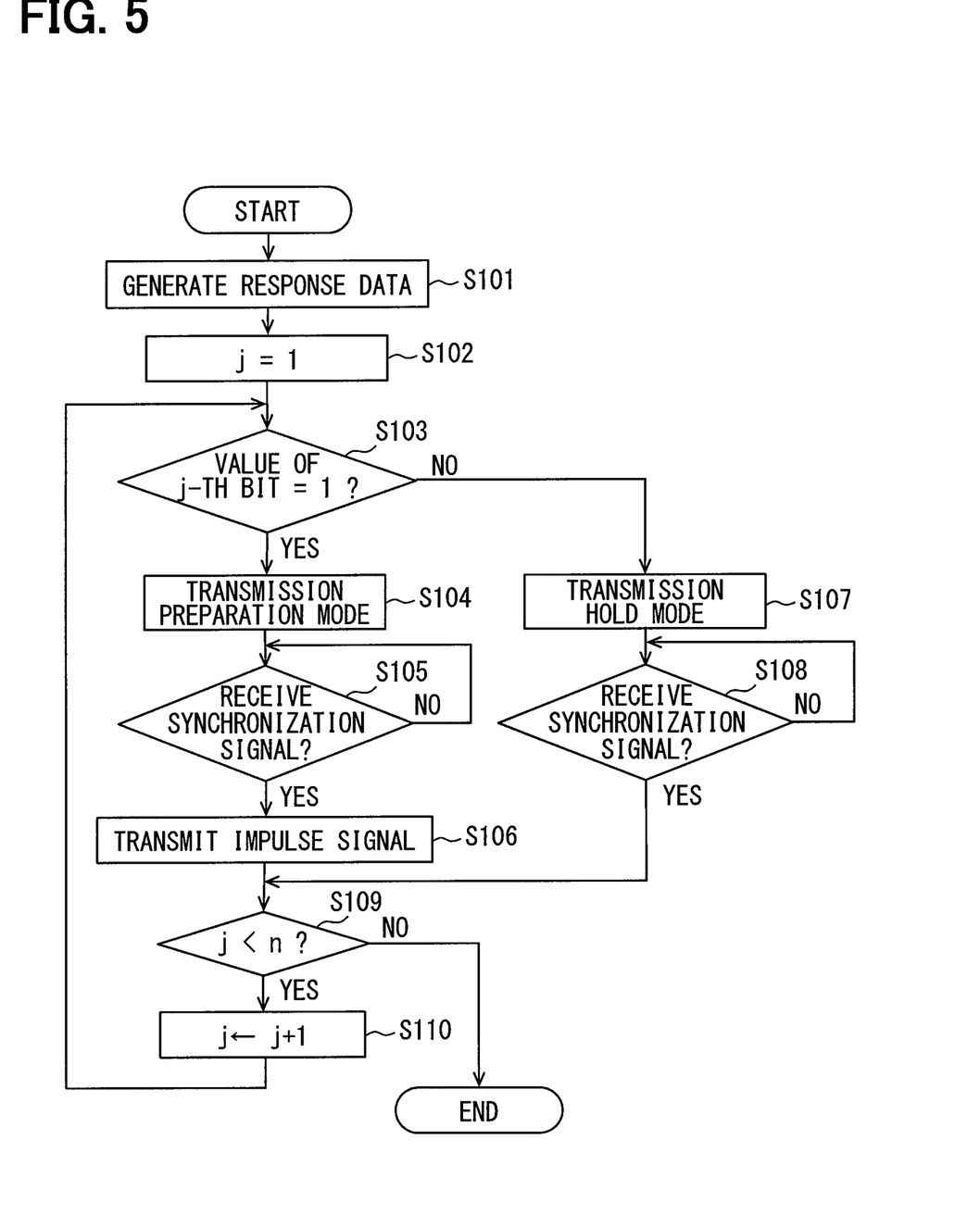
FIG. 5 is a flowchart for explaining an operation of the second terminal side controller.

That is, when receiving response request data, the second terminal side controller 21 operates as shown in a flowchart of FIG. 5. First, at S101, the response data generation unit F22 generates response data corresponding to a content of a received response request data, and the processing proceeds to S102.

At S102, the transmission target bit setting unit F23 sets (i.e., initializes) a variable j used for the subsequent processing to 1, and the processing proceeds to S103. Note that a positive integer is set for the variable j.

At S103, the transmission target bit setting unit F23 determines whether or not a value of a j-th bit of the response request data is 1. For example, when j=1, it is determined whether or not the leading bit of the response request data is 1. When the value of the j-th bit of the response request data is 1, an affirmative determination is made at S103, and the processing proceeds to S104. When the value of the j-th bit of the response request data is not 1, namely, when the value of the j-th bit is 0, a negative determination is made at S103, and the processing proceeds to S107.

At S104, the transmission target bit setting unit F23 sets the operation mode of the transmission processing unit F24 to the transmission preparation mode, and the processing proceeds to S105. At S105, the reception processing unit F21 waits until receiving the synchronization signal. When the synchronization signal is received, the processing proceeds to S106. When the synchronization signal is not received even after a lapse of a predetermined time from the shift to S105, the present flow may be ended. At S106, the transmission processing unit F24 outputs the impulse signal to the second terminal side transmitter 22 to transmit the impulse signal as a radio wave, and the processing proceeds to S109. That is, when the value of the transmission target bit is 1, the impulse signal is transmitted with the reception of the synchronization signal as a trigger.

Note that a method for identifying whether the received impulse signal is an impulse signal as a synchronization signal or an impulse signal as a part of data may be designed appropriately. In the present embodiment, as an example, the reception processing unit F21 is configured to determine that the impulse signal received within a fixed time after receiving the response request data is not an impulse signal as a part of the data, but an impulse signal as a synchronization signal.

Needless to say, the method of identifying whether the received impulse signal is an impulse signal as a synchronization signal or an impulse signal as a part of data is not limited to the above example. For example, a bit string, which indicates that transmission of a synchronization signal will be started may be placed at the end of the data transmitted by the first terminal 1 to cause the second terminal 2 to recognize that the impulse signal received within a fixed time from the end is an impulse signal as a synchronization signal.

At S107, the transmission target bit setting unit F23 sets the operation mode of the transmission processing unit F24 to the transmission hold mode, and the processing proceeds to S108. At S108, the reception processing unit F21 waits until receiving the synchronization signal. When the reception processing unit F21 receives the synchronization signal, the processing proceeds to S109. That is, when the value of the transmission target bit is 0, the impulse signal is not transmitted. When the synchronization signal is not received even after a lapse of a predetermined time from the shift to S108, the present flow may be ended.

At S109, it is determined whether or not the value of the variable j is smaller than a bit number n of the response data. When the value of the variable j is smaller than the bit number n of the response data, an affirmative determination is made at S109, and the processing proceeds to S110. On the other hand, when the value of the variable j is not smaller than the bit number n of the response data, a negative determination is made at S110, and the present flow is ended. The bit number n here is 7. At S110, the transmission target bit setting unit F23 adds 1 to the value of j (i.e., increments) and returns to S103.

Note that the case where the value of the variable j is smaller than the bit number n of the response data means a state where the response data has not been transmitted completely. Further, the case where the value of the variable j is not smaller than the bit number n of the response data means a state where the transmission of the response data has been completed.

(Operation of Distance Estimating System)

Next, the operation of the distance estimating system 100 of the present embodiment will be described with reference to FIG. 6. Here, as an example, the operations of the first terminal 1 and the second terminal 2 will be described by taking as an example a case where the first terminal 1 transmits response request data with bit pattern set to "11011." Note that a horizontal axis of various drawings shown in FIG. 6 represents a lapse of time.

Figure 6:
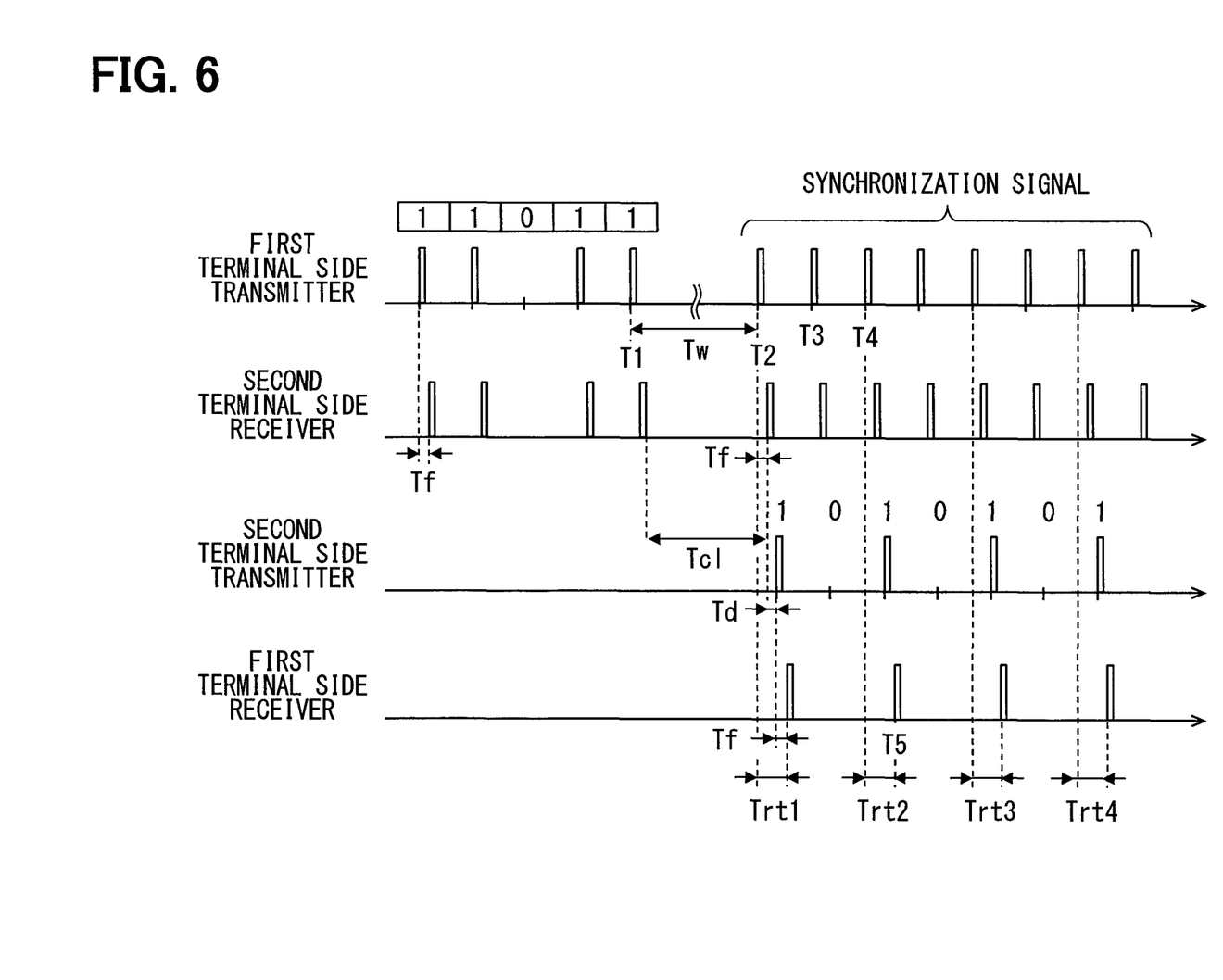
FIG. 6 is a diagram for explaining an operation of the distance estimating system according to the present embodiment.

When the data generation unit F11 of the first terminal 1 generates the response request data consisting of a bit string "11011", as shown in FIG. 6, the first terminal side transmitter 12 transmits a pulse series signal corresponding to the response request data as a response request signal. As described above, the pulse series signal as the response request signal is a signal series in which an impulse signal is arranged at a position corresponding to a bit at which binary 1 is set in the response request data.

Further, based on an instruction of the transmission processing unit F12, the first terminal side transmitter 12 starts transmitting the impulse signal as the synchronization signal from a time point T2 at which a predetermined standby time Tw elapses from a time point T1 at which the transmission of the response request signal is completed at the transmission interval Tps. The standby time Tw may be set to a length corresponding to an assumed value (i.e., design value) of a required computing time Tcl to be described later, and may be set to a length of about 70% of the assumed value of the required computing time Tcl, for example. The state in which the first terminal 1 periodically transmits the synchronization signal may be continued for a predetermined time (hereinafter, transmission continuation time). The transmission continuation time may be appropriately designed based on the maximum value of a time taken from completion of transmission of the response request signal to reception of the response signal returned from the second terminal 2.

Based on a clock signal input from the clock oscillator 114, the round-trip timer F14 starts measuring an elapsed time from transmission of the synchronization signal by the first terminal side transmitter 12. As described above, the count value of the round-trip timer F14 is reset each time the synchronization signal is transmitted.

Each impulse signal constituting the response request signal transmitted by the first terminal side transmitter 12 is received by the second terminal side receiver 23 with a delay of a flight time Tf from the transmission time point. The flight time Tf is a time taken for a radio wave to propagate from the first terminal 1 to the second terminal 2 and is proportional to the inter-terminal distance. Specifically, the flight time Tf corresponds to a value obtained by dividing the inter-terminal distance by a propagation velocity C of the radio wave. The propagation velocity C in the air is $3 \times 10^8$ (i.e., 3×10 to the eighth power) [m/s].

When the reception processing unit F21 of the second terminal 2 finishes receiving a series of pulse series signal as the response request signal, the reception processing unit F21 demodulates the pulse series signal to generate reception data. Then, the response data generation unit F22 generates response data corresponding to a content of the received data (i.e., response request data). Here, due to receiving the bit string "11011" as the response request data, the response data generation unit F22 generates a bit string consisting of "1010101" as response data.

Note that the processing of specifying the content of the received data (i.e., response request data) and generating the response data corresponding to the content corresponds to arithmetic processing. Tcl shown in FIG. 6 represents a time required for the arithmetic processing (hereinafter, required computing time).

Then, in cooperation with the transmission target bit setting unit F23, the transmission processing unit F24 transmits an impulse signal or no impulse signal in accordance with the value of the transmission target bit in order from a first bit of the response data in synchronization with reception of the synchronization signal. Specifically, the impulse signal is transmitted when the value of the transmission target bit is a predetermined value previously determined to be a value to transmit the impulse signal, and the impulse signal is not transmitted when the value is not the predetermined value. When the transmission processing unit F24 is in the transmission preparation mode, Td shown in the figure represents an internal transmission time from reception of the impulse signal as the synchronization signal of the second terminal side receiver 23 until transmission of the impulse signal by the second terminal side transmitter 22.

This internal transmission time Td is derived from the transmission time of the impulse signal from the second terminal side receiver 23 to the second terminal side controller 21, the transmission time of the impulse signal from the second terminal side controller 21 to the second terminal side transmitter 22, or some other time. The internal transmission time Td may also include a time until the second terminal side controller 21 recognizes the input of the impulse signal from the second terminal side receiver 23 and outputs an impulse signal. However, the internal transmission time Td is sufficiently smaller than the required computing time Tcl.

A series of a plurality of impulse signals transmitted as the response signal by the second terminal side transmitter 22 are received by the first terminal side receiver 13 with a delay of flight time Tf from the transmission time points.

The round-trip timer F14 saves, as a round-trip time, a count value at a time point of reception of the impulse signal by the first terminal side receiver 13 into the RAM 112 or the like. Note that the transmission interval Tps is set to a value sufficiently larger than a time obtained by adding the flight time Tf corresponding to the maximum value of the inter-terminal distance as a detection range and an assumed value of the internal transmission time Td.

In the example shown in FIG. 6, since the second terminal side transmitter 22 transmits a pulse series signal including four impulse signals as the response signal, the round-trip time can be measured four times. Any of Trt1 to Trt4 in FIG. 6 represents the round-trip time detected by the round-trip timer F14.

The distance estimation unit F15 estimates an inter-terminal distance based on the round-trip time Trt1 acquired as described above. Here, as an example, a round-trip flight time is calculated by subtracting an assumed value of the preset internal transmission time Td from the round-trip time Trt1. Then, a value obtained by multiplying a value obtained by dividing the round-trip flight time by 2 by the propagation velocity C is adopted as the inter-terminal distance.

As another aspect, the arithmetic processing described above is performed on each of the round-trip times Trt1 to Trt4, to calculate a plurality of inter-terminal distance candidates and adopt an average value of the inter-terminal distance candidates. Alternatively, an average value of the flight time may be calculated from the respective average values of the round-trip times Trt1 to Trt4, and the inter-terminal distance may be calculated from the average flight time and the propagation velocity. Needless to say, a median value may be used instead of the average value. Estimating the inter-terminal distance by using the plurality of round-trip times Trt1 to Trt4 enables improvement in accuracy.

Meanwhile, the first terminal 1 may be configured such that not only the internal transmission time Td in the second terminal 2 but also the internal transmission time Td in the first terminal 1 is included in the round-trip time measured by the round-trip timer F14. In such a case, it is preferable to take a value obtained by subtracting twice the assumed value of the internal transmission time Td from the round-trip time Trt1 as the round-trip flight time.

(Effects of Present Embodiment)

Figure 7:
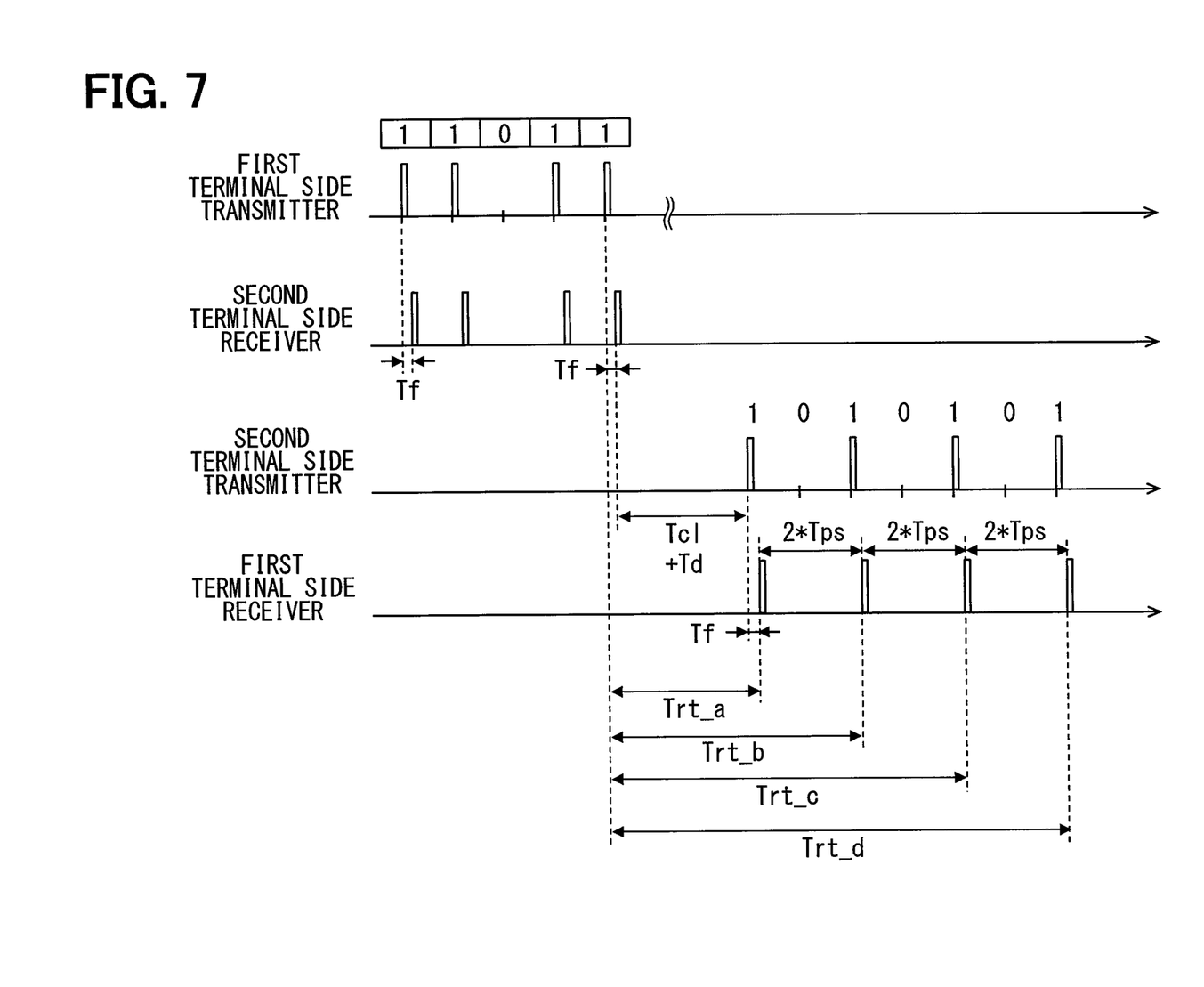
FIG. 7 is a diagram showing an operation of a comparative configuration.

Next, the operation and effects of the present embodiment described above will be described by introducing a comparative configuration. As shown in FIG. 7, in the comparative configuration, an elapsed time from transmission of the last impulse signal constituting the response request signal until reception of the impulse signal by the first terminal side receiver 13 is adopted as the round-trip time. Trt_a, Trt_b, Trt_c, and Trt_d shown in FIG. 7 represent the round-trip time (hereinafter, comparative trip time) detected by the comparison configuration.

The comparative trip time Trt_a is calculated as a total value of the flight time Tf of the impulse signal from the first terminal 1 to the second terminal 2, the required computing time Tcl, the internal transmission time Td, and the flight time Tf of the impulse signal from the second terminal 2 to the first terminal 1. In addition, any of the comparative trip time Trt_b, the comparative trip time Trt_c, and the comparative trip time Trt_d is a value obtained by adding an integer multiple (e.g., 2 times, 4 times, 6 times) of the transmission interval Tps to the comparative trip time Trt_a.

In the comparative configuration, the comparative trip time Trt_a as the round-trip time includes an assumed value of the required computing time Tcl. Thus, for estimating the inter-terminal distance from the comparative trip time Trt_a, it is necessary to exclude the assumed value of the required computing time Tcl from the measured round-trip time.

However, an error corresponding to the accuracy of the clock oscillator 214 (hereinafter, clock accuracy) provided in the second terminal is included in an error between a design value of the required computing time Tcl and an actual value. Further, depending on the accuracy of the clock oscillator 114 provided in the first terminal, a time measured as the round-trip time itself also includes an error. Such an error arising from the accuracy of each clock oscillator is accumulated and increases as the required computing time Tcl is longer. That is, in the comparative configuration, it is susceptible to an error arising from the clock accuracy.

On the other hand, each of the round-trip times Trt1 to Trt4 measured according to the present embodiment is a total value of the flight time Tf of the impulse signal from the first terminal 1 to the second terminal 2, the internal transmission time Td, and the flight time Tf of the impulse signal from the second terminal 2 to the first terminal 1, and does not include the required computing time Tcl or the transmission interval Tps. That is, according to the configuration of the present embodiment, the time measured as the round-trip time can be shortened as compared to the comparative configuration.

As described above, the shorter the length of the round-trip time, the less susceptible to the error arising from the clock accuracy. Also, the internal transmission time Td itself is also sufficiently smaller than the required computing time Tcl. Therefore, according to the configuration of the present embodiment, it is possible to measure the inter-terminal distance accurately as compared to the comparative configuration.

In the present embodiment, the count value of the round-trip timer F14 is reset each time the synchronization signal is transmitted. Accordingly, the time from a time point T3 to a point time T5 shown in FIG. 6 can be restricted from being erroneously adopted as the round-trip time. Note that the impulse signal triggered by the synchronization signal transmitted at the time point T3 is not transmitted according to on-off keying because the value of the transmission target bit at that time is 0.

Furthermore, when the first terminal and the second terminal perform communication of UWB-IR to which on-off keying has been applied as in the present embodiment, from the start to the end of transmission of the response data, it takes the second terminal 2 a length of time obtained by multiplying a value, obtained by subtracting 1 from the bit number n of the response data (i.e., n−1), by the transmission interval Tps.

Therefore, in the configuration in which the first terminal and the second terminal perform the communication of UWB-IR to which on-off keying is applied, if the time from completion of data transmission to completion of reception of the response data in the first terminal (e.g., Trt_d in FIG. 7) is adopted as the round-trip time, the round-trip time includes the length of time obtained by multiplying Tps by n−1.

Thus, for performing computing on the inter-terminal distance from the round-trip time acquired by the comparative configuration, it is necessary to exclude from the round-trip time not only the required computing time Tcl but also the time derived from the transmission interval Tps.

However, the impulse transmission interval itself is also affected by the error of the clock oscillator described above. Therefore, as the bit string transmitted and received is longer, the error included in the round-trip time becomes larger.

With respect to such a problem, according to the configuration of the present embodiment, the element depending on the transmission interval Tps is not included in the round-trip time. Therefore, it is possible to estimate the inter-terminal distance with even higher accuracy.

When a radio wave is used as a transmission medium for an impulse signal as in the present embodiment, inclusion of an error of only 7 ns in the round-trip time causes occurrence of an error of 1 m or more as the inter-terminal distance. Therefore, specifying a more accurate round-trip time can be said to be an important task in estimating an accurate inter-terminal distance.

The first terminal in the above configuration successively transmits an impulse signal as a synchronization signal at a predetermined transmission interval for a predetermined time after the transmission of the response request signal is completed. In addition, the second terminal informs the first terminal of the value of each bit of the response data by sequentially transmitting or not transmitting the impulse signal. Specifically, when the value of the bit as the transmission target is a value (e.g., 1) to transmit the impulse signal, the impulse signal is transmitted with the reception of the synchronization signal as a trigger.

Then, the round-trip timer provided in the first terminal measures the time from transmission of the synchronization signal until reception of the impulse signal as the round-trip time.

The round-trip time measured by such a configuration does not include the time for the second terminal to execute processing for generating response request data corresponding to the response request data (i.e., required computing time). Therefore, the difference between the assumed value of the required computing time and the actual required computing time in the second terminal is not reflected as an error of the flight time.

Since the round-trip time measured by the above configuration does not include the required computing time in the second terminal, the time measured as the round-trip time itself is shorter than the assumed configuration described above. As a result, the amount of the error arising from the accuracy of the clock oscillator provided in the first terminal and included in the round-trip time to be measured can be reduced.

According to the above configuration, the round-trip time hardly includes the difference between the assumed value of the required computing time and the actual required computing time in the second terminal, and the error arising from the accuracy in the clock oscillator provided in the first terminal. It is thus possible to restrict deviation of the flight time, calculated from the round-trip time, from the actual value. That is, it is possible to specify the flight time more accurately. As a result, the distance between the first communication terminal and the second communication terminal can be estimated more accurately.

Note that components having the same functions as the components described in the above embodiment are denoted by the same reference numerals, and description of those components is omitted. Further, when only a part of the configuration is referred to, the configuration of the embodiment described above can be applied to the other portions.

(Application Example of Present Embodiment)

The distance estimating system described above may be applied to a known vehicle electronic key system. The vehicle electronic key system is a system that controls a locked state of a vehicle door by wireless communication being performed between a portable device carried by a user and a vehicle side device mounted in the vehicle. As the vehicle electronic key system, a keyless entry system, a smart entry system, etc. are applicable.

For example, the vehicle side device may have a function as the first terminal 1, and the portable device may have a function as the second terminal. In that case, the vehicle-side device can estimate the distance to the portable device by measuring the above round-trip time when carrying out wireless communication with the portable device.

The distance estimating system described above may be applied to a system that controls a locked state of a door of a house by wireless communication being performed between a portable device carried by a user and a communication device installed at home, Further, when three or more first terminals 1 are arranged at different positions, the position of the second terminal 2 can be specified based on the installation position of each first terminal 1 and the distance from each first terminal 1 to the second terminal 2. That is, the inter-terminal distance estimated by the above embodiment can be applied to the position estimation of the second terminal 2. The system for estimating the position of the second terminal 2 can be applied to various things such as inventory management of goods in distribution and analysis of flow lines of warehouse workers.

(Modification 1)

In the embodiment described above, the aspect has been described in which the correspondence between the bit pattern of the response request data transmitted by the first terminal 1 and the bit pattern of the response data returned by the second terminal 2 is predetermined, and the second terminal 2 specifies the bit pattern of the response data to be returned from the bit pattern of the received response request data. However, this is not restrictive. Arithmetic processing using a predetermined function may be accompanied by generation of the response data.

For example, the distance estimating system 100 described above can also be applied to a communication system in which the first terminal 1 and the second terminal 2 perform authentication processing by transmitting and receiving data, such as a challenge response method.

It is assumed that the first terminal 1 provided in such a communication system transmits data including a challenge code as response request data to the second terminal 2. The challenge code may be a bit string corresponding to a random number series or a pre-designed bit string.

When receiving the data that includes the challenge code, the second terminal 2 generates a response code from the challenge code by using a predetermined coding function previously registered in the second terminal 2, and returns data including the response code as response data to the second terminal 2.

The first terminal 1 transmits the data including the challenge code as the response request data and generates a verification code from the challenge code by using a predetermined coding function. The coding function used here is the same as the coding function registered in the second terminal 2. Then, the response code returned from the second terminal 2 is compared with the verification code, and when these codes match or satisfy a predetermined relationship, it is determined that the authentication is successful. Determining that the authentication is successful corresponds to determining that the communication partner is the second terminal 2.

Also in such an aspect, since the round-trip time measured by the first terminal 1 does not include the required computing time or the like used for generating the response code, the same effect as the embodiment described above is exerted.

(Other Modifications)

Although the aspect has been described above where the radio wave in the impulse form is transmitted as the impulse signal, the transmitted and received impulse signal may be a sound wave in the impulse form.

Although the aspect has been described above where the first terminal 1 and the second terminal 2 have different functions, the present disclosure is not limited to this. The communication terminal provided in the distance estimating system 100 may be configured to have both functions of the first terminal 1 and the second terminal 2. In other words, the function as the second terminal 2 may be added to the first terminal 1 described above.

The flowchart, or the processing of the flowchart, described in the present disclosure is made up of a plurality of parts (or referred to as steps), and each part is expressed as S101, for example. Further, each part can be divided into a plurality of sub parts, while a plurality of parts can be combined into one part. Further, each part configured in this manner can be referred to as a circuit, a device, a module, or means.

Also, each of the pluralities of parts described above or a combination of the parts may be not only (i) a software unit combined with a hardware unit (e.g., computer), but also (ii) hardware (e.g., integrated circuit, wiring logic circuit) with or without a function of a relevant device. Moreover, the hardware section can also be configured inside a microcomputer.

While the disclosure has been described with reference to the embodiments thereof, it is to be understood that the disclosure is not limited to the embodiments and constructions. The disclosure is intended to cover various modification and equivalent arrangements. In addition, the various combinations and configurations, and other combinations and configurations including more, less or only a single element are also within the spirit and scope of the disclosure.

What is claimed is:

1. A distance estimating system comprising:
a first terminal and a second terminal that perform wireless communication of on-off keying by transmitting and receiving impulse signals, wherein the first terminal includes a data generation unit that generates response request data for requesting the second terminal to return a response signal,
a first terminal side transmitter that transmits a response request signal in which impulse signals are arranged at a predetermined transmission interval in accordance with a bit string constituting the response request data, and
successively transmits impulse signals as synchronization signals at the predetermined transmission interval for a predetermined time after the transmission of the response request signal is completed, and
a first terminal side receiver that receives impulse signals returned from the second terminal as the response signal to the response request signal,
the second terminal includes a second terminal side receiver that receives the response request signal,
a response data generation unit that generates response data based on a bit string as the response request data, specified by demodulating the response request signal received by the second terminal side receiver,
a transmission target bit setting unit that increments a bit, which is a transmission target in a bit string as the response data generated by the response data generation unit, by one toward a rear side from a leading bit to a trailing bit each time the synchronization signal is received, and
a second terminal side transmitter that transmits the return impulse signal in a case where a value of the bit that is the transmission target bit at a time point of reception of the synchronization signal is a predetermined value previously determined as a value indicating that the return impulse signal is to be transmitted, and transmits no impulse signal in a case where the value of the bit is not the predetermined value, and
the first terminal further includes a round-trip timer that measures a time from transmission of the synchronization signal to reception of the returned impulse signal as a round-trip time, and
a distance estimation unit that specifies a flight time during which the returned impulse signal has propagated through a space based on the round-trip time measured by the round-trip timer, and estimates a distance to the second terminal based on the flight time and a propagation velocity that is a speed at which the returned impulse signal propagates in the space.

2. The distance estimating system according to claim 1, wherein a count value of the round-trip timer is reset each time the synchronization signal is transmitted.

3. The distance estimating system according to claim 1, wherein the second terminal is configured to transmit a pulse series signal including two or more of the impulse signals as one response signal, the round-trip timer measures the round-trip times respectively corresponding to two or more of the impulse signals corresponding to the one response signal, and the distance estimation unit estimates the distance to the second terminal by using the round-trip times.

4. The distance estimating system according to claim 1, wherein the on/off keying impulse signals are a radio wave in an impulse form.

5. The distance estimating system according to claim 1, wherein the on/off keying impulse signals are a sound wave in an impulse form.

6. A distance estimating system comprising a first terminal and a second terminal that perform wireless communication of on-off keying by transmitting and receiving impulse signals, wherein the first terminal includes a first terminal side controller that includes a processor and a non-transitory tangible storage medium storing a first terminal program, the first terminal program instructing the processor in the first terminal side controller to generate response request data for requesting the second terminal to return a response signal, a first terminal side transmitter that is connected with the first terminal side controller, transmits a response request signal in which impulse signals are arranged at a predetermined transmission interval in accordance with a bit string constituting the response request data, and successively transmits impulse signals as synchronization signals at the predetermined transmission interval for a predetermined time after the transmission of the response request signal is completed, and a first terminal side receiver that is connected with the first terminal side controller, receives impulse signals returned from the second terminal as the response signal to the response request signal, the second terminal includes a second terminal side receiver that receives the response request signal, a second terminal side controller that is connected with the second terminal side receiver and includes a processor and a non-transitory tangible storage medium storing a second terminal program, the second terminal program instructing the processor in the second terminal side controller to generate response data based on a bit string as the response request data, specified by demodulating the response request signal received by the second terminal side receiver, and to increment a bit, which is a transmission target in a bit string as the response data, by one toward a rear side from a leading bit to a trailing bit each time the synchronization signal is received, and a second terminal side transmitter that is connected with the second terminal side controller, transmits the return impulse signal in a case where a value of the bit that is the transmission target bit at a time point of reception of the synchronization signal is a predetermined value previously determined as a value indicating that the return impulse signal is to be transmitted, and transmits no impulse signal in a case where the value of the bit is not the predetermined value, and the first terminal program further instructs the processor in the first terminal side controller to measure a time from transmission of the synchronization signal to reception of the returned impulse signal as a round-trip time, and specify a flight time during which the returned impulse signal has propagated through a space based on the round-trip time, and estimate a distance to the second terminal based on the flight time and a propagation velocity that is a speed at which the returned impulse signal propagates in the space.

* * * * *